UNITED STATES PATENT OFFICE.

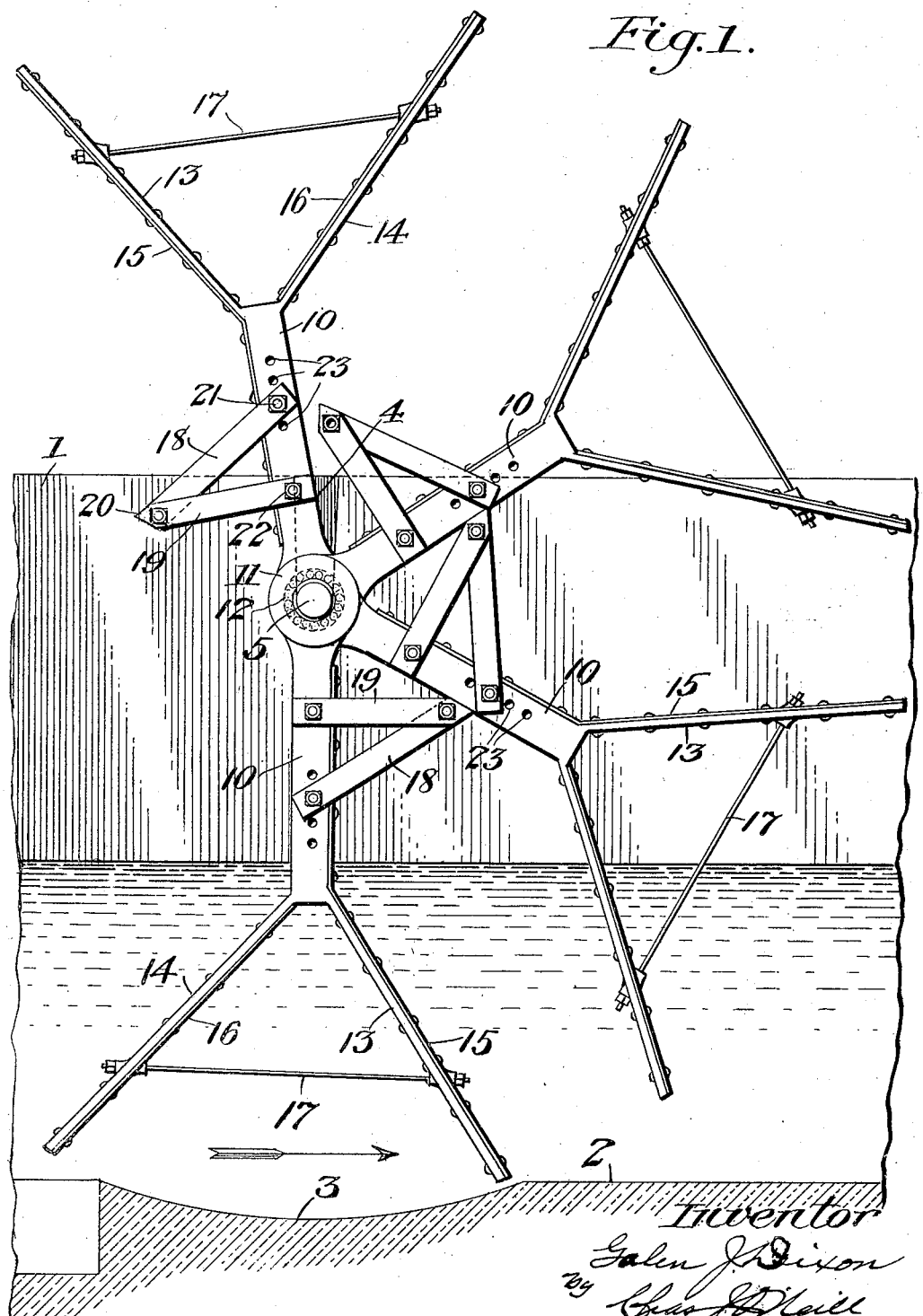

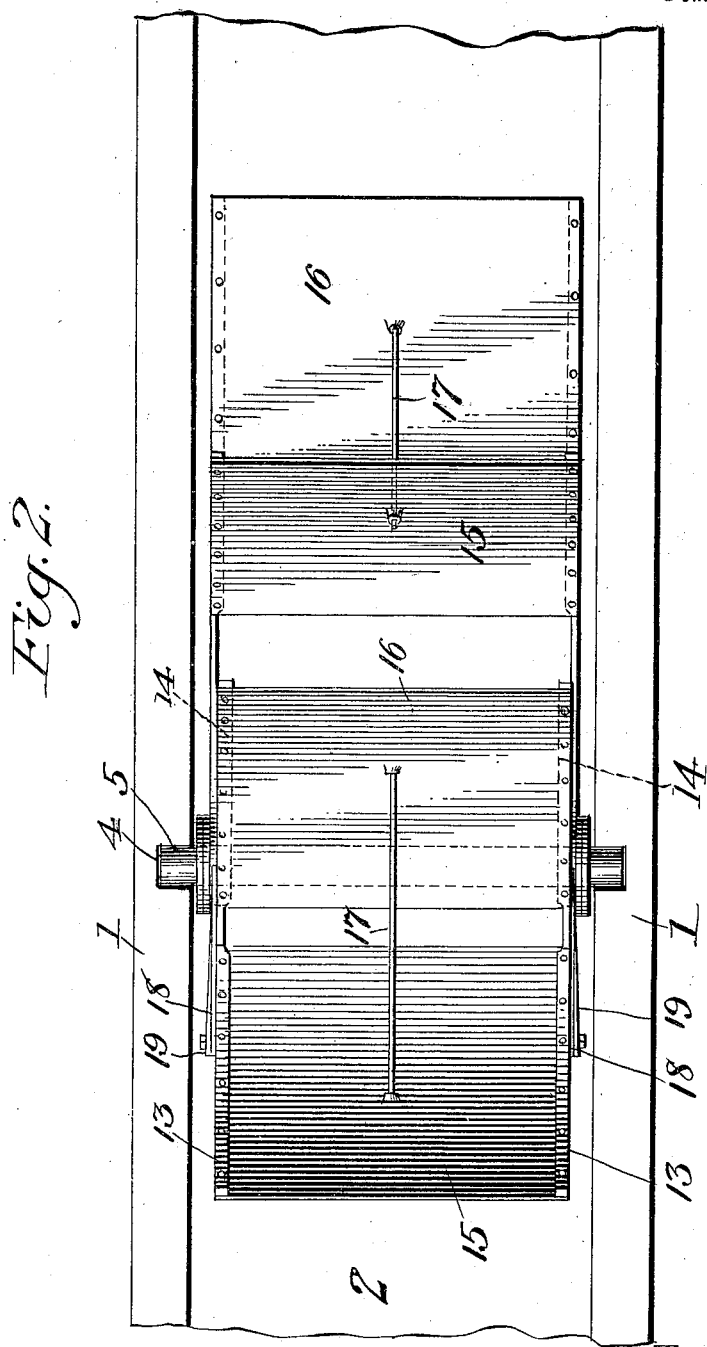

GALEN J. DIXON, OF BISHOP, CALIFORNIA.

FISH SCREEN OR GUARD.

1,346,881.          Specification of Letters Patent.     Patented July 20, 1920.

Application filed March 22, 1920. Serial No. 367,587.

*To all whom it may concern:*

Be it known that I, GALEN J. DIXON, a citizen of the United States, residing at and whose post-office address is Bishop, county of Inyo, State of California, have invented certain new and useful Improvements in Fish Screens or Guards; and I do hereby declare the following to be a full, clear, and exact description of the invention, such as will enable others skilled in the art to which it appertains to make and use the same.

This invention relates to fish screens or guards to be employed in canals, irrigation ditches, and the like, to prevent the passage of fish, and, at the same time, to avoid obstructing the water way or restricting the normal flow to an appreciable extent.

To these ends, the invention comprises a series of independently movable frames rotatably mounted on a shaft spanning the water way, each of said frames including a pair of arms laterally spaced on the shaft and each pair of arms being provided with one or more transverse blades, preferably of bright metal, and abutments on each frame adapted to engage a preceding frame and lift the latter to a point where it falls by gravity, the number and arrangement of the frames being such that they constitute, in effect, a half drum, formed of separate sections, the several sections on the downstream side of the apparatus being temporarily connected by the abutments on the said sections or frames, so that the lowermost acts as a paddle wheel to lift the preceding series of frames until the topmost thereof passes beyond the vertical axis of the machine and topples over, falling through an arc of substantially 180°, striking the water with a decided concussion and producing a moving shadow, as well as a series of flashes or reflections from the bright surfaces of the paddle blades, thereby serving to scare the fish and cause them to leave the vicinity of the apparatus.

After the lower portion of the falling frame has been submerged, the abutment thereon passes into engagement with the next preceding frame and the blade or blades of the falling frame then begin to function as paddle wheels, actuated by the current in the waterway and said frame then takes up its operation of lifting the series of preceding frames. Each of the frames passes through the cycle of operations just described in regular order so that, at all times, at least one of the frames has its blades completely submerged to an extent sufficient to close the waterway to the passage of fish without, however, obstructing the movement of floating debris, which latter is, on the contrary, assisted in its movement past the screen by the operation of the blades of the frame.

The invention is illustrated in the accompanying drawings, in which:

Figure 1 is a side elevation of the complete apparatus as applied to a small waterway, irrigation ditch, flume, or the like.

Fig. 2 is a plan view of the apparatus.

Referring to the drawings, 1, 1 indicate the sides or walls of an irrigation ditch, flume, or the like, and 2 the bottom thereof, which, at the point where the apparatus is to be installed, are formed of concrete, wood, or similar material. The bottom of the ditch immediately below the horizontal axis of the machine, is concaved as at 3, the surface conforming to the arc traversed by the blades of the machine, so that the lower edges of the blades or frames are in close proximity to the bottom for a considerable distance.

The side walls 1 of the ditch or flume are provided with bearings or supports for the end of a transverse shaft 5, the said bearings in the exemplification of the apparatus in the drawings being formed as vertical slots 4 in which the ends of the shaft 5 rest, and which permit the entire apparatus to be readily lifted out of the ditch when necessary.

Revolubly mounted upon the shaft 5 is a series of independent frames, each comprising two arms 10 located near the ends of the shaft 5, each arm having a central hub 11, preferably provided with a ball-bearing raceway coöperating with the surface of the shaft 5. The outer end of each shaft is bifurcated to provide two diverging end sections 14 and 15. Connecting the ends 13, 13 of each pair of arms is a blade 15, which may be of bright colored metal or any other suitable material and which extends from the outer ends of the members 13 to a point adjacent the hub of the respective arms, so as to constitute a paddle blade and also a barrier extending substantially from the axis of rotation of the machine to the bottom of the ditch when the particular frame to which the blade is attached is in submerged and operative position. A blade 16 of similar material is secured to the outer ends 14 of the arms 10, preferably on the inner side of said arms, as shown, and as the blade 16 follows 15 in the submerging operation, the said blade 16 corresponds in height to the length of the arm ends 14. A suitable brace-rod 17 extends between the blades 15 and 16 and serves to strengthen the frame as thus constituted, and prevents the blades and the arms from buckling or being deformed under the exegencies of use.

Preferably the ends 13 of the arms are set at a less angle to the longitudinal axes of the arms than are the arm ends 14, for reasons hereinafter disclosed.

Secured to each of the arms 10 is an abutment, preferably formed of two metallic members 18 and 19 disposed in generally V-shaped arrangement and connected at their outer ends by a bolt or rivet 20, and to the arm by bolts 21 and 22, the former being applied to one of a series of holes 23 in the arm so as to regulate the extent of projection of the abutment in advance of the arm, in the direction of movement of the frame.

A series of the frames as thus constituted and constructed is disposed upon the shaft 5 so that the said series of frames constitutes, what is in effect, a half-drum or paddle-wheel, the blades of which extend substantially across the water-way as illustrated in the drawings. It will be understood that if the apparatus is to be used in a wider water way, a multiple series of similar rotating frames may be arranged longitudinally of the shaft, each series of frames constituting a half paddle wheel acting independently of the others, but all serving to effectively screen the entire width and depth of the water way.

The apparatus is operated automatically by the flow of the water in the irrigation ditch or flume as follows. Assuming the water to be flowing in the direction of the arrow in Fig. 1, it will be noted that the blades 15 and 16 of the lowermost frame are subject to the full force of the flowing water and act as paddle-wheels or impellers to move the frame in the direction of flow. It will also be noted that the abutment formed by the members 18 and 19 on the lowermost frame engages arm 10 of the next preceding frame and the abutment on the latter is in engagement with the corresponding arm on the second preceding frame, so that the lowermost frame in its movement of rotation, lifts the several preceding frames so that in the form of the apparatus shown, involving four independently movable frames, the lowermost of the submerged frames is lifting the other three frames and this operation is continued until the uppermost frame passes the vertical axis of the apparatus and begins to topple over as illustrated in Fig. 1, and falls through an arc of substantially 180°, the advanced blade 15 thereof striking the water with a heavy impact and the movement of the entire frame producing a moving shadow and a flash or reflection from the bright surfaces of the blades, all of which tend to frighten the fish away from the screen. Should any fish, however, persist in moving down-stream, it would be prevented from passing beyond the screen by the presence of the blades of at least one of the frames completely obstructing the waterway as evidenced by the lowermost frame in Fig. 1, in which the blade 15 is shown just leaving the concave portion 3 of the bottom of the ditch, while the following blade 16 is entering the concave portion of the bottom so that at all times a blade of at least one of the frames interposes an effective barrier across the water way. The blade 15 is set at a less angle to the longitudinal axis of the arms 10 than the blade 16, first, to increase the initial effect of the current as the blade enters the water, and second, to prevent the blade acting as a scoop for any floating material as the blade leaves the water; the increased angularity of the following blade 16 supplements the decreasing paddle-wheel effect of the forward blade 15 as the latter rises and also replaces the rising blade as a barrier across the water way and serves the latter function until the following frame has completed its fall and the abutment thereon engages the submerged frame and begins to assist in the operation of lifting the several preceding frames. As arranged, the several independently movable frames with their associated blades, constitute what, in effect, is a half drum or paddle wheel composed of several independently rotatable sections, each of which, upon leaving the upper limit of its rotatory movement and passing the dead center, begins a falling movement, which persists until the blades thereon are submerged and the abutments carried thereon engage the next preceding frame of the series. It will be seen, therefore, that each of the frames or elements constitutes, in itself, an independent screen, but coöperates with the several other frames or elements to move them successively into position where each becomes automatically operative to continue the actuation of the series, as described. The uppermost frame or section automatically drops through the vacant space on the up-stream side of the machine into contact with the surface of the water producing, as explained, a series of moving shadows, reflections, and a heavy splash which are ordinarily sufficient to frighten any fish away from the vicinity. Each screen, as it begins to submerge, is carried by the current into contact with the next preceding screen which, at that time, has its blades in complete obstructing disposition across the water way, and at which time the falling frame immediately begins to function as a paddle-wheel element to assist in lifting the preceding frames. It will be particularly noted that before the rear blade of one frame ceases to function in completely screening or barring the water way, the advanced blade 15 of the next succeeding screen is interposed as a complete barrier across the stream, but notwithstanding the fact that at least two of the blades are always interposed as screening members, the apparatus performs its functions, nevertheless, without materially impeding the flow of the stream, as the individual frames moving freely with the current constitutes no material obstruction thereto. In order to accurately adjust the movement of the several frames and time the initiation of the falling movement of the following top-most frame, the abutments constituted by the members 18 and 19 are adjustable as hereinbefore described. By shifting the connecting bolt 21 from one to another of the holes 23 in the arm 10 the extent of projection of the abutment beyond the edge of the arm may be regulated thereby determining the distance between each succeeding frame during the lifting operation, and also properly regulating the distance between the rear blade of the submerged frame and the forward blade of the following frame after the latter has fallen into contact with the water and submerged to a sufficient degree to engage the preceding frame. The several frames and the blades connected therewith are self cleansing by reason of their complete inversion during each complete revolution of the corresponding frame and also by reason of the heavy impact with which they strike the water, which would assist in dislodging any material which had adhered to the blades or the frame arms.

It will be noted that the apparatus is essentially simple in construction, easily accessible and removable for adjustment and repair, and may be readily applied to any waterway without the necessity of extensive preparations or modifications of the boundaries of the water way, and, as indicated, when the water way is of considerable width, a series of the half drums, made of independently rotatable frames may be disposed longitudinally of the shaft so as to completely screen and protect the waterway as described.

What I claim is:

1. A fish guard comprising a shaft; a series of independently movable frames rotatably mounted on said shaft, each frame including a pair of arms longitudinally spaced on said shaft, transverse blades connecting the respective pairs of arms; and abutments on each frame adapted to engage a preceding frame and lift the latter to a point where it falls by gravity.

2. A fish guard comprising a shaft; a series of independently movable frames rotatably mounted on said shaft, each frame including a pair of arms longitudinally spaced on said shaft, and having divergent end members, transverse blades connecting the corresponding end members of the respective pairs of arms; and abutments on each frame adapted to engage a preceding frame and lift the latter to a point where it falls by gravity.

3. A fish guard comprising a shaft; a series of independently movable frames rotatably mounted on said shaft; each frame including a pair of arms longitudinally spaced on said shaft and having divergent end members, the angularity of the advance end member of each arm with respect to the main portion of the arm being less than that of the rear member, transverse blades connecting each pair of arms; and abutments on each frame adapted to engage a preceding frame and lift the latter to a point where it falls by gravity.

4. A fish guard comprising a shaft; a series of independently movable frames rotatably mounted on said shaft, each frame including a pair of arms longitudinally spaced on said shaft and having divergent end members, a transverse blade connecting each pair of arms on the advance side thereof and extending substantially throughout the length of said arms, a transverse blade of less height connecting the rear members of each pair of arms; and abutments on each frame adapted to engage a preceding frame and lift the latter to a point where it falls by gravity.

GALEN J. DIXON.